(12) United States Patent
Nakamura et al.

(10) Patent No.: US 12,079,615 B2
(45) Date of Patent: Sep. 3, 2024

(54) COMMUNICATION APPARATUS, MOVABLE OBJECT, CONTROL SYSTEM, SERVER, COMMUNICATION CONTROL METHOD

(71) Applicant: HONDA MOTOR CO., LTD., Tokyo (JP)

(72) Inventors: Koichiro Nakamura, Tokyo (JP); Yosuke Shionoya, Tokyo (JP); Genta Inoue, Tokyo (JP); Tomoaki Taki, Tokyo (JP); Koji Kajiwara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 262 days.

(21) Appl. No.: 17/679,117

(22) Filed: Feb. 24, 2022

(65) Prior Publication Data
US 2022/0291919 A1 Sep. 15, 2022

(30) Foreign Application Priority Data
Mar. 9, 2021 (JP) .................... 2021-037819

(51) Int. Cl.
*G06F 9/445* (2018.01)
*G06F 8/65* (2018.01)
(Continued)

(52) U.S. Cl.
CPC .............. *G06F 8/65* (2013.01); *G07C 5/008* (2013.01)

(58) Field of Classification Search
CPC ..... G06F 8/65; G06F 8/71; G06F 8/66; G06F 8/654; G06F 21/572; G06F 21/52;
(Continued)

(56) References Cited

U.S. PATENT DOCUMENTS

| 7,797,099 B2 * | 9/2010 | Terada ................ F02D 41/009 701/112 |
| 2008/0183484 A1 | 7/2008 | Kondo |

(Continued)

FOREIGN PATENT DOCUMENTS

| JP | 2008179314 A | 8/2008 |
| JP | 2020027666 A | 2/2020 |
| WO | 2015159815 A1 | 10/2015 |

OTHER PUBLICATIONS

Office Action issued for counterpart Japanese Application No. 2021-037819, issued by the Japanese Patent Office on Dec. 13, 2022 (drafted on Dec. 9, 2022).

*Primary Examiner* — Thuy Dao (57) ABSTRACT

A communication apparatus is provided in a movable object, and communicates with an external server. The communication apparatus includes a communication control unit for controlling communication with the server, and controlling communication with a movable object control unit controlling the movable object and communication with an update control unit controlling program update of the movable object control unit. The communication control unit performs, when control on the movable object control unit is to be performed from the server, control to receive a first startup request and a command for the movable object control unit from the server, start up and control the movable object control unit, and performs, when control related to program update of the movable object control unit is to be performed from the server, control to receive a second startup request for the update control unit from the server, and start up the update control unit.

18 Claims, 7 Drawing Sheets

(51) Int. Cl.
   *G06F 8/654*   (2018.01)
   *G06F 9/455*   (2018.01)
   *G06F 11/14*   (2006.01)
   *G07C 5/00*    (2006.01)
   *H04L 29/06*   (2006.01)
   *H04W 4/40*    (2018.01)

(58) Field of Classification Search
   CPC ..... G07C 5/008; G07C 9/00309; H04W 4/44;
              H04W 4/80; H04W 4/50; H04W 12/35;
              H04W 4/40; H04L 67/34; H04L 67/12;
              H04L 9/3242; H04L 63/08; H04L 9/3249;
              H04L 9/3247; H04L 67/125; H04L 67/10;
              H04L 9/3252
   See application file for complete search history.

(56) References Cited

U.S. PATENT DOCUMENTS

2017/0026492 A1    1/2017   Kawamura
2020/0092375 A1*   3/2020   Clark .................... H04L 9/3249
2021/0191661 A1    6/2021   Harata

* cited by examiner

COMMUNICATION APPARATUS, MOVABLE OBJECT, CONTROL SYSTEM, SERVER, COMMUNICATION CONTROL METHOD

The contents of the following Japanese patent application(s) are incorporated herein by reference: NO. 2021-037819 filed on Mar. 9, 2021.

BACKGROUND

1. Technical Field

The present invention relates to a communication apparatus, a movable object, a control system, a server, and a communication control method.

2. Related Art

Patent document 1 discloses an ECU capable of rewriting an application program as an ECU for vehicles.
Patent document 1: Japanese Patent Application Publication No. 2020-27666

DESCRIPTION OF EXEMPLARY EMBODIMENTS

Hereinafter, the present invention will be described by way of embodiments of the invention, but the following embodiments are not intended to restrict the invention according to the claims. In addition, not all combinations of features described in the embodiments necessarily have to be essential to solving means of the invention.

Figure 1:
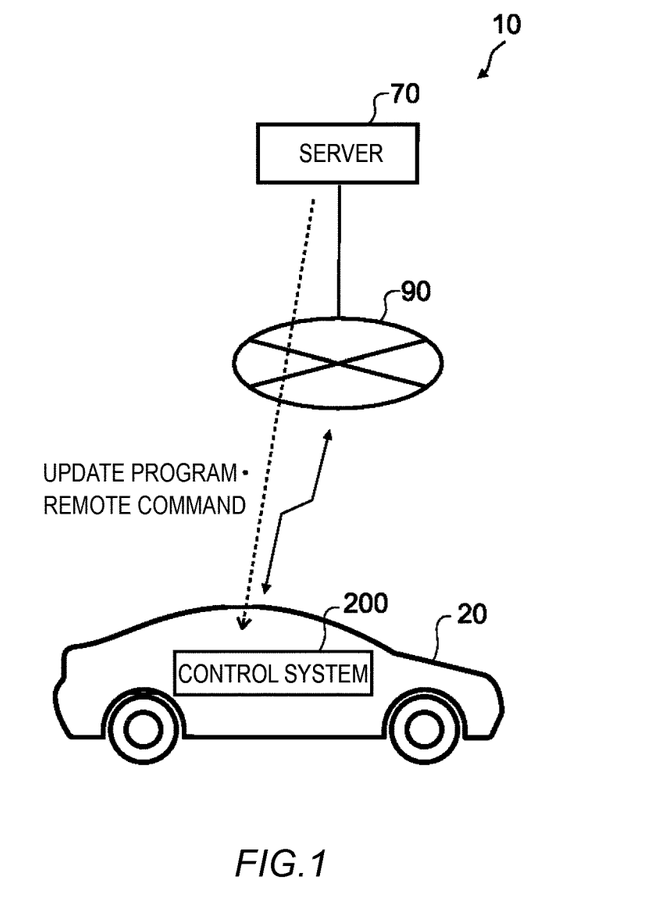
FIG. 1 schematically illustrates an update system 10 according to one embodiment.

FIG. 1 schematically illustrates an update system 10 according to one embodiment. The update system 10 includes a vehicle 20 and a server 70. The vehicle 20 includes a control system 200. The control system 200 is responsible for control of the vehicle 20 and communication with the server 70 through a communication network 90. The communication network 90 includes an IP network such as the Internet, a P2P network, a dedicated circuit including a VPN, a virtual network, a mobile communication network, or the like.

In the vehicle 20, the control system 200 includes a plurality of electronic control units (ECUs) configured to perform control of the vehicle 20. The server 70 performs control related to reprogramming of the ECU included in the control system 200. For example, the server 70 transmits an update program to the control system 200 through the communication network 90, and the control system 200 receives the update program transmitted through the communication network 90 by wireless communication. The control system 200 performs reprogramming of the ECU included in the control system 200 by the update program. The reprogramming is performed for a purpose of upgrade of a function of the ECU included in the control system 200 or the like. In this manner, the control system 200 updates the ECU by reprogramming the ECU over the air (OTA). According to the present embodiment, update of a device such as the ECU by the update program is referred to as "program update".

When control related to the program update of the ECU included in the control system 200 is to be performed, the server 70 causes a communication apparatus included in the control system 200 to start up the ECU configured to control the program update. Then, the server 70 transmits a command related to the program update to the ECU configured to control the program update.

On the other hand, the server 70 has a function for performing a remote operation of the vehicle 20. For example, when a locking apparatus of a door of the vehicle 20 is to be remotely locked, the server 70 transmits a remote command to instruct the locking of the locking apparatus to the vehicle 20. When the remote command is received from the server 70, the communication apparatus included in the control system 200 interprets the remote command, and issues a command to lock the locking apparatus to the ECU configured to control the locking apparatus.

As described above, when the control related to the program update of the ECU included in the control system 200 is to be performed, the communication apparatus included in the control system 200 starts up the ECU configured to control the program update, and the ECU configured to control the program update receives the command related to the program update from the server 70. For this reason, when an occasion arises that more new commands related to the program update are required, an operation of the server 70 and processing of the ECU configured to control the program update may need to be changed, but it is not necessary to change an operation of the communication apparatus included in the control system 200. For this reason, work to verify the operation of the communication apparatus is also not required. Thus, changes to or addition of the command related to the program update is facilitated.

It should be noted that according to the present embodiment, for convenience, the description will be provided where the server 70 is responsible for a server configured to perform the remote operation of the vehicle 20 and the processing related to the program update. However, a server configured to perform the remote operation of the vehicle 20 and a server responsible for the processing related to the program update may be separately provided.

Figure 2:
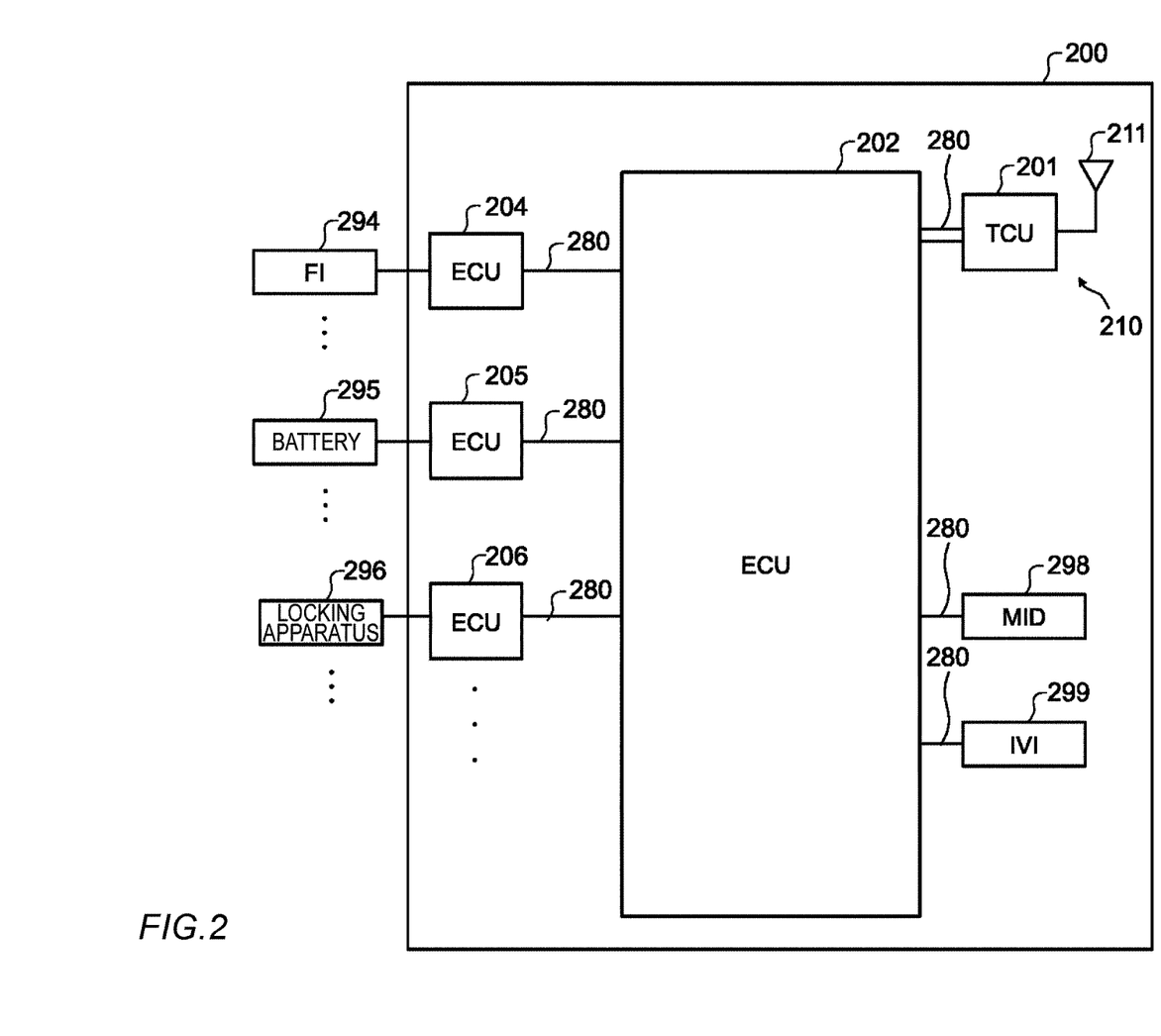
FIG. 2 schematically illustrates a system configuration included in a control system 200.

FIG. 2 schematically illustrates a system configuration included in the control system 200. The control system 200 includes a communication apparatus 210 including a TCU 201 and an antenna 211, an ECU 202, an ECU 204, an ECU 205, an ECU 206, an MID 298, and an IVI 299. In FIG. 2, an FI 294, a battery 295, and a locking apparatus 296 are devices included in the vehicle 20. The FI 294, the battery 295, and the locking apparatus 296 are one example of controlled devices of the vehicle 20.

The ECU 202 is connected to the TCU 201, the ECU 204, the ECU 205, and the ECU 206 through an in-vehicle communication network 280. The ECU 202 performs information communication with the TCU 201, the ECU 204, the ECU 205, the ECU 206, the MID 298, and the IVI 299 through the in-vehicle communication network 280. The ECU 202 controls the TCU 201, the ECU 204, the ECU 205, the ECU 206, the MID 298, and the IVI 299 in an overall manner. The in-vehicle communication network 280 may be configured by including, for example, a controller area network (CAN), an Ether network, or the like. The in-vehicle communication network 280 is one example of a "communication channel" that is a channel to perform the information communication.

The TCU 201 is a telematics control unit. The TCU 201 is mainly responsible for mobile communication. The TCU 201 performs transmission and reception of data with the server 70 based on control of the ECU 202. The TCU 201 receives the update program transmitted from the server 70 by the mobile communication based on the control of the ECU 202.

The MID 298 is a multi information display. The IVI 299 is, for example, an infotainment information device (IVI). The MID 298 and the IVI 299 may function as a display control unit. The IVI 299 includes a wireless LAN communication function. The IVI 299 receives the update program transmitted from the server 70 by wireless LAN communication based on the control of the ECU 202.

Each of the ECU 204, the ECU 205, and the ECU 206 is an ECU as a vehicle control unit configured to control the vehicle 20. The ECU 204, the ECU 205, and the ECU 206 are one example of a "movable object control unit". The ECU 204, the ECU 205, and the ECU 206 are configured to control various types of devices included in the vehicle 20. For example, the ECU 204 controls the FI 294 that is a fuel injection apparatus or the like. The ECU 205 controls the battery 295 that is a high voltage battery or the like. The ECU 206 controls the locking apparatus 296 or the like.

According to the present embodiment, the system configuration in which the control system 200 includes the TCU 201, the ECU 202, the ECU 204, the ECU 205, the ECU 206, the MID 298, and the IVI 299 is exemplified, but the system configuration of the control system 200 is not limited to the example of the present embodiment. In addition, according to the present embodiment, the ECU 202 is an ECU configured to control the program update. That is, the ECU 202 functions as an update control unit configured to control the program update. It should be noted that a target of the program update may be the ECUs 202 to 206. However, the TCU 201 and the ECU 202, the IVI 299, and the like may also be a target of the program update.

The TCU 201 is provided in the vehicle 20, and communicates with the external server 70. The TCU 201 controls communication with the server 70, and also controls communication with the ECU 203 to 206 configured to control the vehicle 20 and communication with the ECU 202 configured to control the program update of the ECUs 203 to 206. When control on the ECUs 203 to 206 is to be performed from the server 70, the TCU 201 performs control to receive a first startup request and a command for the ECUs 203 to 206 from the server 70, starts up the ECUs 203 to 206 in response to the first startup request and the command from the server 70, and also controls the ECUs 203 to 206 in response to the command. When control related to the program update of the ECUs 203 to 206 is to be performed from the server 70, the TCU 201 performs control to receive a second startup request for the ECU 202 from the server 70, and starts up the ECU 202 in response to the second startup request from the server 70.

After the ECU 202 is instructed to start up, when the ECU 202 has started up, the TCU 201 performs control to transmit information indicating that the ECU 202 has started up to the server 70.

Before the second startup request is received from the server 70, the communication apparatus 210 receives a third startup request for the TCU 201 from the server 70. After the communication apparatus 210 has started up in response to the third startup request, the TCU 201 performs control to receive the second startup request from the server 70.

The communication apparatus 210 receives the third startup request through a circuit switching network of the mobile communication network. For example, the TCU 201 receives the third startup request by a short message service (SMS). After the communication apparatus 210 has started up in response to the third startup request, the TCU 201 performs control of communication through a packet switching network with the server 70. For example, the TCU 201 performs control of communication through the packet switching network of the mobile communication network.

In a case where the TCU 201 is communicable with the server 70 through a wireless LAN, after the ECU 202 has started up, the TCU 201 may cause communication through the wireless LAN to be executed between the ECU 202 and the server 70. In a case where the TCU 201 is not communicable with the server 70 through the wireless LAN, after the ECU 202 has started up, the TCU 201 relays communication through a communication network of the vehicle 20 between the ECU 202 and the server 70.

Here, the program update will be described. Program update processing in a case where a device set a target of the program update is an ECU and a memory for firmware storage of the ECU is a single bank memory (so called one-side ROM) will be described. In this case, since there is a single program storage area for firmware storage of the ECU, an update program cannot be written to the program storage area when the ECU is operating according to the program stored in the program storage area. When the program update of the ECU is to be performed, the ECU 202 transfers the update program to the ECU to cause the update program to be stored in a predetermined data storage area of the ECU, and then instructs the ECU to perform the program update. When the program update is instructed, the ECU executes a control code for performing the program update, writes the update program transferred to the data storage area to the program storage area, and activates the update program. The activation of the update program includes processing of setting a startup parameter of the ECU such that the update program is loaded to start control based on the update program at the time of startup of the ECU, for example. It should be noted that when the memory for firmware storage of the ECU is the single bank memory, a "state in which the program update of the ECU can be performed" may be a state in which the update program is stored in a predetermined data storage area of the ECU.

Next, program update processing in a case where an internal memory of the ECU is a double bank memory (so called two-side ROM) will be described. In this case, since the ECU has two program storage areas for firmware storage, when the ECU is operating according to a program stored in a first program storage area, the update program can be written to a second program storage area. For example, the update program can be written to the second program storage area even when, for example, the vehicle 20 is in motion. For this reason, when the update program is transferred to the ECU, the ECU 202 instructs the ECU to write the update program to the second program storage area. When the write of the update program to the second program storage area of the ECU is completed, a state is established in which the program update of the ECU can be performed. When the ECU 202 is to perform the program update of the ECU, the ECU 202 instructs the ECU to activate the update program written to the second program storage area. The activation of the update program includes processing of setting a startup parameter of the ECU such that the update program stored in the second program storage area is loaded to start control based on the update program at the time of startup of the ECU, for example. For example, the activation of the update program includes processing of enabling the second program storage area as a read area of the program and also disabling the first program storage area as the read area of the program. In this manner, the "program update of the ECU" is a concept including the write of the update program to the program storage area of the ECU. In addition, the "program update of the ECU" is a concept including the activation of the update program written to the program storage area.

Figure 3:
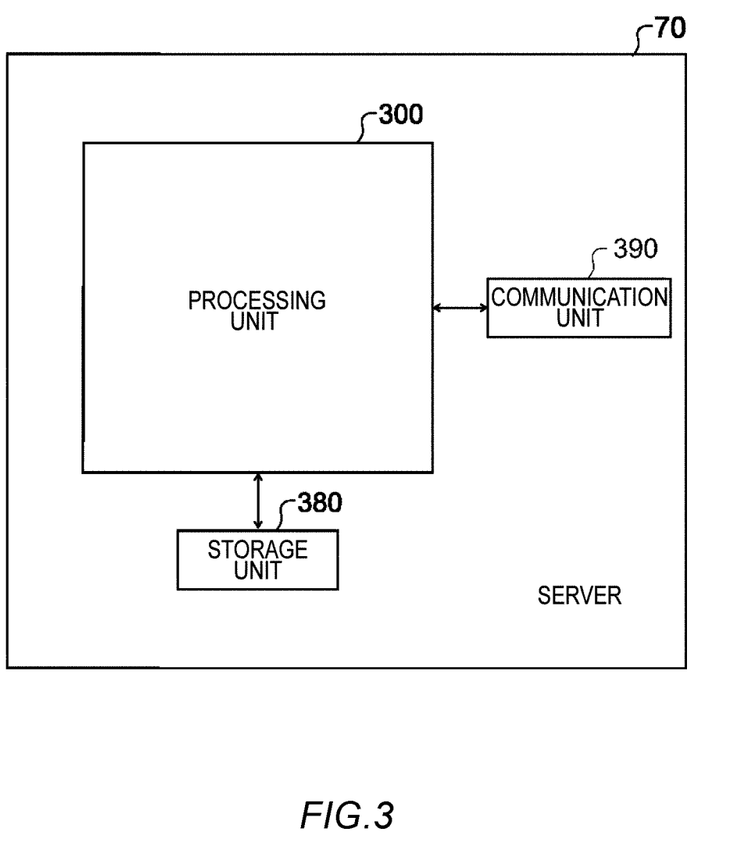
FIG. 3 illustrates a system configuration of a server 70.

FIG. 3 illustrates a system configuration of the server 70. The server 70 includes a communication unit 390, a storage unit 380, and a processing unit 300.

The processing unit 300 is realized, for example, by an arithmetic processing apparatus including a processor. The storage unit 380 is realized by including a nonvolatile storage medium. The processing unit 300 is configured to perform processing by using information stored in the storage unit 380. The communication unit 390 is responsible for communication with a plurality of vehicles including the vehicle 20.

The server 70 transmits a command for a control unit such as the ECU or the TCU provided in the vehicle 20. When a command is to be transmitted to the ECU provided in the vehicle 20, the communication unit 390 transmits request information for starting up the ECU to the TCU 201, and transmits the command to the ECU in response to reception of a command request from the ECU. With this configuration, when it is necessary to perform addition or change of a command, it is not necessary to change processing of the TCU 201.

According to the present embodiment, when a command related to the program update is to be transmitted to the ECU 202, the communication unit 390 transmits request information for starting up the ECU 202 to the TCU 201, and transmits the command to the ECU 202 in response to reception of the command request from the ECU 202. On the other hand, when the ECUs 202 to 206 are caused to perform control other than the program update, the communication unit 390 transmits a command related to the control of the ECUs 202 to 206 to the TCU 201, and an ECU set as a target of the control is controlled from the TCU 201.

Figure 4:
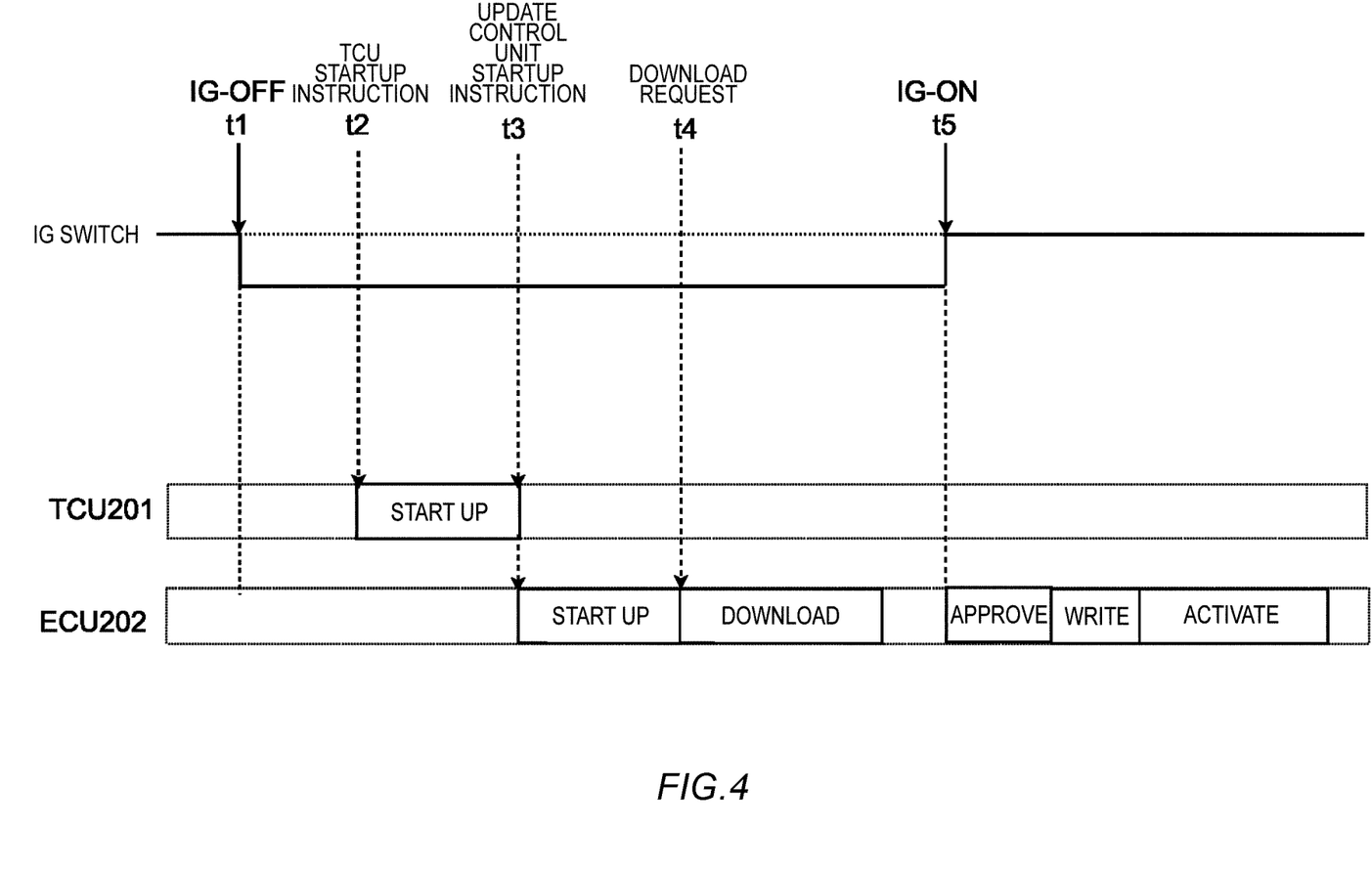
FIG. 4 schematically illustrates one example of a time chart related to program update.

FIG. 4 schematically illustrates one example of a time chart related to program update. FIG. 4 illustrates states of an IG switch, the TCU 201, and the ECU 202.

At a time point t1, after a user turns off the IG switch, the server 70 causes the ECU 202 to download an update program. In this case, at a time point t2, the communication unit 390 of the server 70 transmits a startup request for the TCU 201 to the TCU 201. The communication unit 390 transmits the startup request by an SMS. The TCU 201 starts up in response to the startup request transmitted from the server 70.

When the TCU 201 has started up, at a time point t3, the communication unit 390 transmits a startup request for the ECU 202 to the TCU 201. When the startup request for the ECU 202 is received, the TCU 201 starts up the ECU 202.

When the ECU 202 has started up, at a time point t4, the communication unit 390 of the server 70 transmits a download request of the update program to the ECU 202. When the download request of the update program is received from the server 70, the ECU 202 starts download of the update program from the server 70.

After the download of the update program is ended, when the IG switch is turned on at a time point t5, the ECU 202 performs processing for obtaining approval for execution of the program update from an occupant of the vehicle 20. For example, the ECU 202 obtains the approval from the occupant of the vehicle 20 through the IVI 299. When the approval for the execution of the program update is obtained from the occupant of the vehicle 20, the ECU 202 starts write to an ECU set as a target of the program update. For example, the ECU 202 transfers the update program to the ECU set as the target of the program update, and instructs the ECU set as the target of the program update to write the update program. When the write is completed, the ECU 202 instructs the ECU set as the target of the program update to perform activation.

It should be noted that in FIG. 4, the case has been described where the server 70 causes the update program to be downloaded when the IG of the vehicle 20 is off. The download of the update program as described above may be executed when the vehicle 20 is parked at night. In addition, as the case where the server 70 remotely starts up the ECU 202, it is possible to exemplify, as well as the case where the update program is downloaded at night, a case where the update is remotely executed after the update program is downloaded, a case where a period of time until the program update is to be completed is set, or the like.

Figure 5:
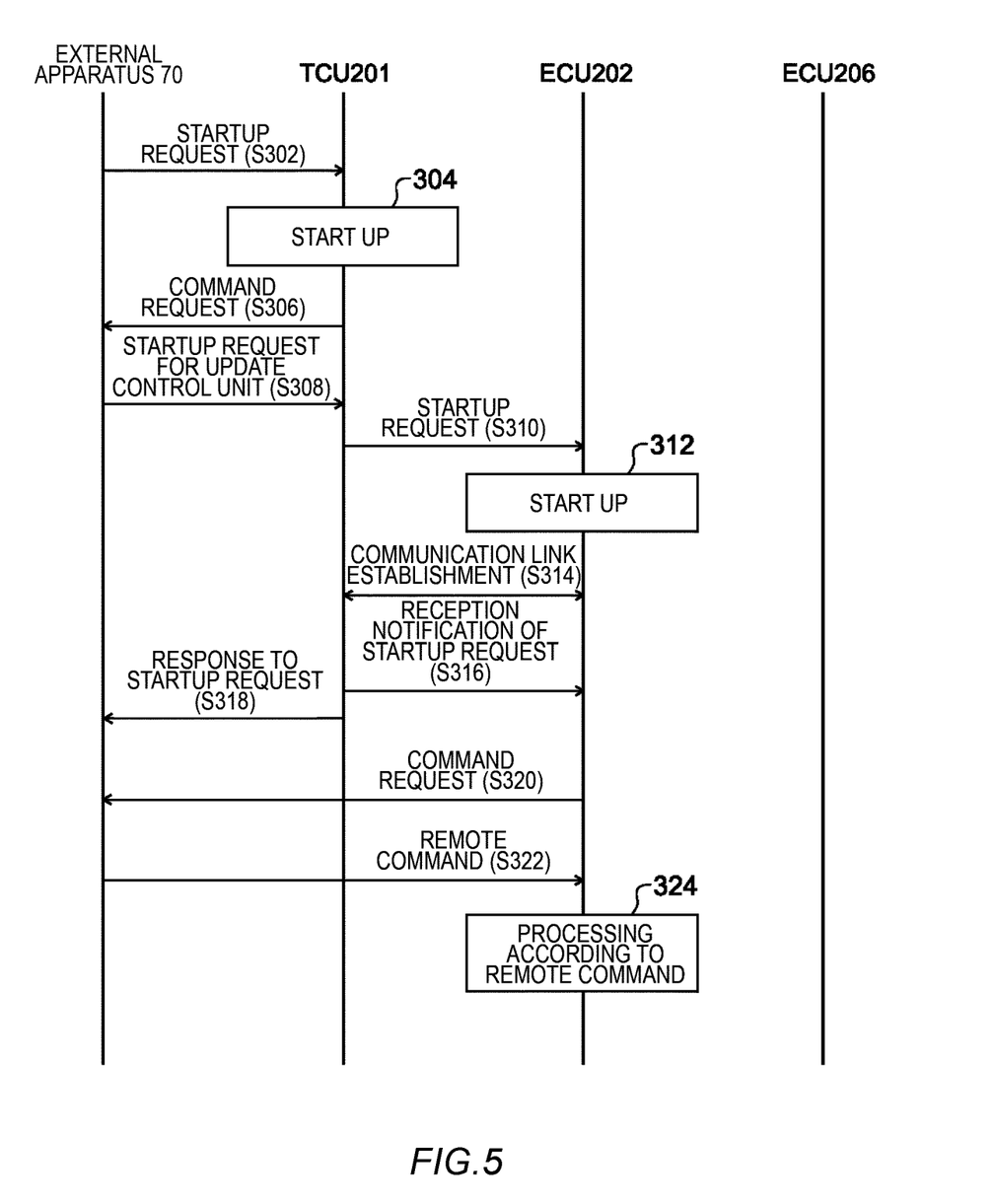
FIG. 5 schematically illustrates a processing sequence in a case where the server 70 executes processing related to the program update.

FIG. 5 schematically illustrates a processing sequence in a case where the server 70 executes processing related to the program update. In S302, the communication unit 390 of the server 70 transmits a startup request for the TCU 201. The communication unit 390 transmits a startup request for the TCU 201 by an SMS.

In S304, the TCU 201 starts up when the startup request is received from the server 70 by the SMS. When the startup of the TCU 201 is completed, in S306, the TCU 201 transmits a command request to the server 70. It should be noted that the TCU 201 performs communication with the server 70 after the startup through the packet switching network. For example, the TCU 201 communicates with the server 70 by an https protocol.

In S308, the communication unit 390 of the server 70 transmits a startup request for the ECU 202 to the TCU 201. When the startup request for the ECU 202 from the server 70 is received, the TCU 201 starts up the ECU 202 in S310. At this time, the TCU 201 transmits a startup request for the ECU 202 through a CAN among the in-vehicle communication networks 280.

In S312, the ECU 202 performs startup processing when the startup request for the ECU 202 is received through the CAN. When the startup is completed, in S314, the ECU 202 establishes a communication link of Ethernet (registered trademark) with the TCU 201. When the communication link of Ethernet is established with the ECU 202, in S316, the TCU 201 transmits information to the ECU 202 indicating that the startup request has been received by an SMS from the server 70 through the established communication link. In addition, the TCU 201 transmits a response to the startup request to the server 70. At this time, when the ECU 202 has normally started up, the TCU 201 may perform an affirmative response indicating that the ECU 202 has started up. When the ECU 202 has not normally started up, the TCU 201 may perform a negative response indicating that the ECU 202 has not started up.

In S320, the ECU 202 transmits a command request to the server 70. In S322, the communication unit 390 of the server 70 transmits a remote command for the ECU 202 in response to reception of the command request. In S324, the ECU 202 performs processing according to the remote command received from the server 70 in S322.

It should be noted that communication between the ECU 202 and the server 70 in S320 and S322 may be performed through the TCU 201. It should be noted that when wireless LAN connection is available with an external access point in the control system 200, the ECU 202 may perform the communication with the server 70 through the wireless LAN. When the wireless LAN connection is available with the external access point in the control system 200, the TCU 201 may instruct the ECU 202 to perform the communication with the server 70 through the wireless LAN. In a case where a wireless LAN function of the control system 200 can be utilized only when the IG switch is on, such control may be performed that mobile communication is utilized for the communication with the server 70 when the IG switch is off, and the wireless LAN is utilized for the communication with the server 70 when the IG switch is on.

Figure 6:
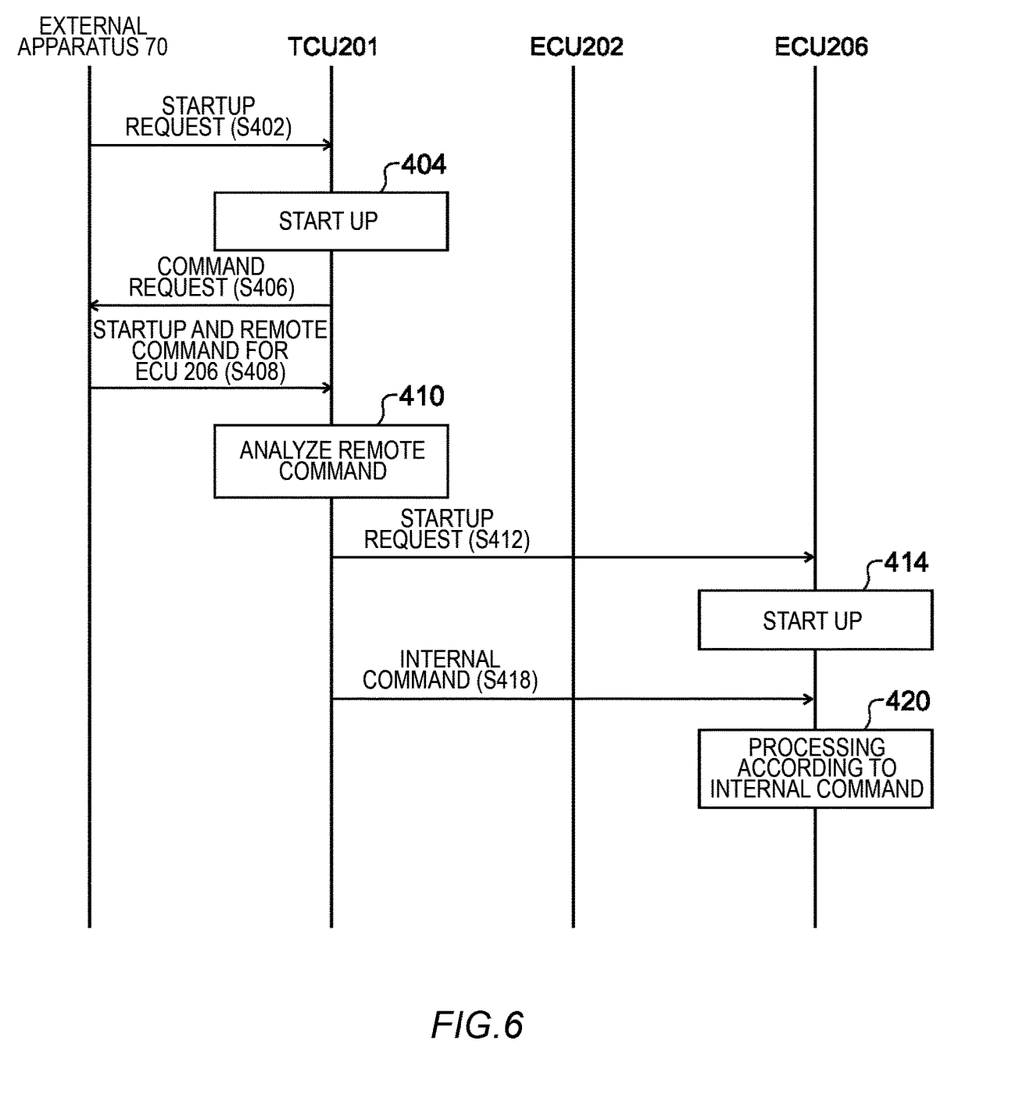
FIG. 6 schematically illustrates a processing sequence in a case where the server 70 performs a remote operation of a vehicle 20.

FIG. 6 schematically illustrates a processing sequence in a case where the server 70 performs a remote operation of a vehicle 20. Processing from S402 to S406 is the same as the processing from S302 to S308 in FIG. 3. That is, when the communication unit 390 of the server 70 transmits a startup request for the TCU 201 by an SMS (S402), the TCU 201 starts up in response to the startup request received from the server 70 (S404), and when the startup is completed, in S406, a command request is transmitted to the server 70.

In S408, the communication unit 390 of the server 70 transmits a startup request and a remote command for the ECU 206 to the TCU 201. It should be noted that the remote command to be transmitted in S408 is set as a command for instructing to lock the locking apparatus 296. When the startup request for the ECU 206 from the server 70 is received, the TCU 201 analyses the remote command in S410, and generates an internal command for the ECU 206 to lock the locking apparatus 296.

In S412, the ECU 206 is caused to start up. The TCU 201 may transmit the startup request for the ECU 206 through a CAN among the in-vehicle communication networks 280. In S414, the ECU 206 performs startup processing when the startup request for the ECU 206 through the CAN is received. When the ECU 206 has started up, the TCU 201 transmits the internal command generated in S410 to the ECU 206. In S420, the ECU 206 performs processing according to the internal command received in S418.

As described above, in accordance with the update system 10 according to the present embodiment, when the control related to the program update of the ECU included in the control system 200 is to be performed, the TCU 201 starts up the ECU 202, and the ECU 202 requests for and receives the command related to the program update from the server 70. For this reason, even when an occasion arises that more new commands related to the program update are required, it is not necessary to change an operation of the TCU 201. For this reason, work to verify the operation of the TCU 201 is also not required. Thus, changes to or addition of the command related to the program update is facilitated.

It should be noted that the vehicle 20 is a vehicle as one example of the transport device. The vehicle may be a motor vehicle such as a motor vehicle including an internal combustion engine, an electric motor vehicle, or a fuel cell motor vehicle (FCV). The motor vehicle includes a bus, a truck, a two-wheeled motor vehicle, or the like. The vehicle may be a saddle type vehicle or the like, or may be a motorbike. Examples of the transport device include devices such as an aircraft including an unmanned aircraft and a vessel in addition to the vehicle. The transport device may be any device configured to transport a person or an article. The transport device is one example of the movable object. The movable object is not limited to the transport device, and may be any movable device.

Figure 7:
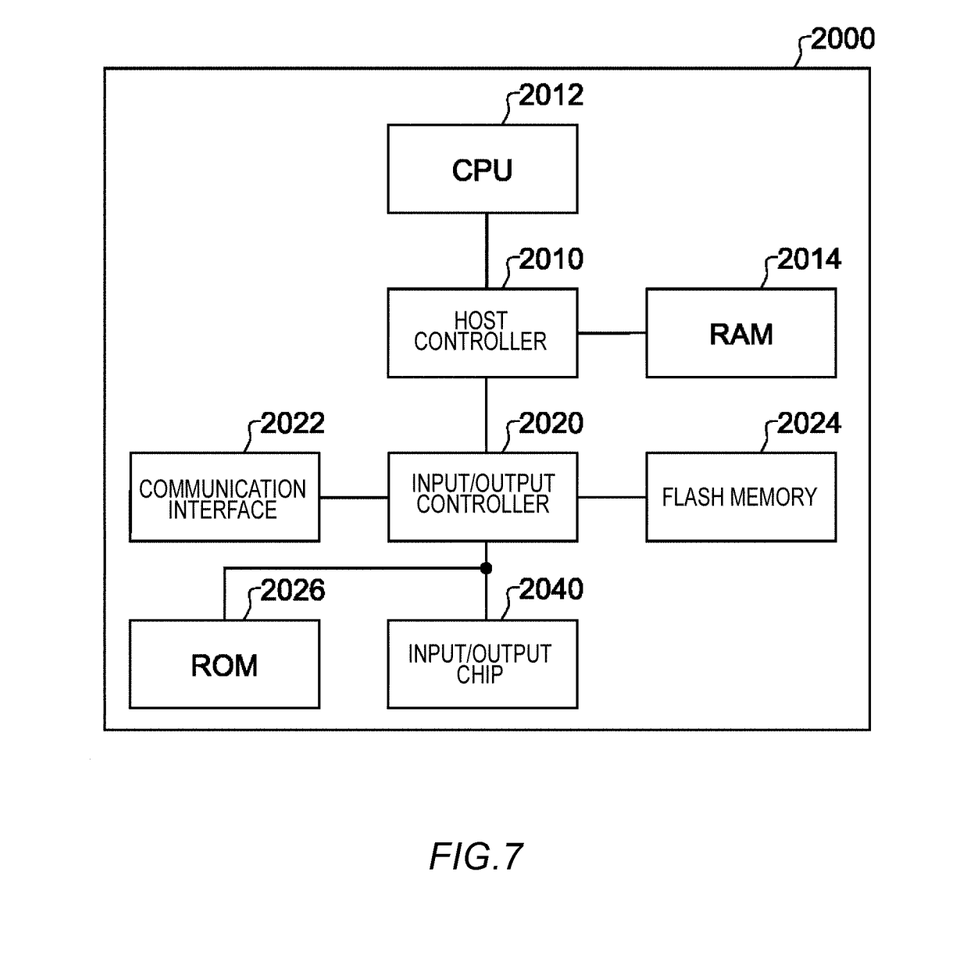
FIG. 7 illustrates an example of a computer 2000 where a plurality of embodiments of the present invention may be entirely or partially embodied.

FIG. 7 illustrates an example of a computer 2000 where a plurality of embodiments of the present invention may be entirely or partially embodied. A program installed on the computer 2000 can cause the computer 2000 to function as a system such as the control system according to the embodiments, the communication apparatus or each unit of the apparatus, to perform operations associated with the apparatus or each unit of the apparatus, and/or to perform the process according to the embodiments or steps of the process. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program or the like that is executed by the computer 2000 during activation, and/or a program that depends on hardware of the computer 2000. In addition, the input/output chip 2040 may connect various input/output units such as a keyboard, a mouse, and a monitor to the input/output controller 2020 via an input/output port such as a serial port, a parallel port, a keyboard port, a mouse port, a monitor port, a USB port, an HDMI (registered trademark) port.

A program is provided via a computer readable storage medium such as a CD-ROM, a DVD-ROM, or a memory card, or a network. The RAM 2014, the ROM 2026, or the flash memory 2024 is an example of the computer readable storage medium. The program is installed in the flash memory 2024, the RAM 2014, or the ROM 2026, and is executed by the CPU 2012. Information processing written in these programs is read by the computer 2000, resulting in cooperation between a program and the above mentioned various types of hardware resources. An apparatus or a method may be configured by implementing operations or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and perform various types of processing on the data on the RAM 2014. The CPU 2012 then writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval and replacement, or the like described herein and specified by instruction sequences of the programs, and write back a result into the RAM 2014. In addition, the CPU 2012 may search for information in a file, a database, or the like in the recording medium. For example, when a plurality of entries, each having an attribute value of a first attribute associated with an attribute value of a second attribute, is stored in the recording medium, the CPU 2012 may search for an entry having a designated attribute value of the first attribute that matches a condition from the plurality of entries, and read the attribute value of the second attribute stored in the entry, thereby obtaining the attribute value of the second attribute associated with the first attribute that satisfies a predetermined condition.

A program or a software module described above may be stored in a computer readable storage medium on the computer 2000 or in proximity to the computer 2000. A recording medium such as a hard disk or a RAM provided in a server system connected to a dedicated communication network or the Internet can be used as a computer readable storage medium. The program stored in the computer readable storage medium may be provided to the computer 2000 via the network.

The program installed on the computer 2000 and causes the computer 2000 to function as the control system 200 may work on the CPU 2012 or the like to cause the computer 2000 to function as each unit of the control system 200, respectively. Information processing written in these programs is read by the computer 2000, thereby functioning as each unit of the control system 200 which is specific means in which a software and various hardware resources described above cooperate with each other. By implementing operations or processing of information according to the intended use of the computer 2000 in the present embodiment using these specific means, a control system 200 specific to the intended use is constructed.

Various embodiments have been described with reference to the block diagrams and the like. In the block diagrams, each block may represent (1) a step of a process in which an operation is executed, or (2) each unit of the apparatus having a role in executing the operation. Specific steps and each unit may be implemented by a dedicated circuit, a programmable circuit supplied along with a computer readable instruction stored on a computer readable storage medium, and/or a processor supplied along with the computer readable instruction stored on the computer readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer readable storage medium may include any tangible device capable of storing an instruction executed by an appropriate device. As a result, the computer readable storage medium having the instruction stored thereon constitutes at least a part of a product including an instruction that may be executed in order to provide a means to execute an operation specified by a processing procedure or a block diagram. Examples of computer readable storage media may include an electronic storage medium, a magnetic storage medium, an optical storage medium, an electromagnetic storage medium, a semiconductor storage medium, etc. More specific examples of the computer readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

The computer readable instruction may include: an assembler instruction, an instruction-set-architecture (ISA) instruction; a machine instruction; a machine dependent instruction; a microcode; a firmware instruction; state-setting data; or either a source code or an object code described in any combination of one or more programming languages, including an object oriented programming language such as Smalltalk (registered trademark), JAVA (registered trademark), C++, or the like; and a conventional procedural programming language such as a "C" programming language or a similar programming language.

Computer readable instructions may be provided to a processor of a general purpose computer, a special purpose computer, or other programmable data processing apparatus, or to programmable circuit, locally or via a local area network (LAN), wide area network (WAN) such as the Internet, and a computer readable instruction may be executed to provide means for performing operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the present invention is not limited to the above described embodiments. It is apparent to persons skilled in the art that various alterations and improvements can be added to the above described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 update system
20 vehicle
70 server
90 communication network
200 control system
201 TCU
202 ECU
204 ECU
205 ECU
206 ECU
210 communication apparatus
211 antenna
280 in-vehicle communication network
294 FI
295 battery
296 locking apparatus
298 MID
299 IVI
300 processing unit
380 storage unit
390 communication unit
2000 computer
2010 host controller
2012 CPU
2014 RAM
2020 input/output controller
2022 communication interface
2024 flash memory
2026 ROM
2040 input/output chip

What is claimed is:

1. A communication apparatus that is provided in a movable object and configured to communicate with an external server, the communication apparatus comprising:
a communication control unit stored in a memory and operated by a processor configured to control communication with the server, and also control communication with a movable object control unit configured to control the movable object and communication with an update control unit configured to control program update of the movable object control unit, wherein
the communication control unit is configured to:
when control on the movable object control unit is to be performed from the server, perform control to receive a first startup request and a command for the movable object control unit from the server, start up the movable object control unit in response to the first startup request and the command from the server, and also control the movable object control unit in response to the command; and
when control related to program update of the movable object control unit is to be performed from the server, perform control to receive a second startup request for the update control unit from the server, and start up the update control unit in response to the second startup request from the server.

2. The communication apparatus according to claim 1, wherein after the update control unit is instructed to start up, when the update control unit has started up, the communication control unit is configured to perform control to transmit information indicating that the update control unit has started up to the server.

3. The communication apparatus according to claim 2, wherein
before the second startup request is received from the server, the communication apparatus is configured to receive a third startup request for the communication apparatus from the server, and
after the communication apparatus has started up in response to the third startup request, the communication control unit is configured to perform control to receive the second startup request from the server.

4. The communication apparatus according to claim 3, wherein
the communication apparatus is configured to receive the third startup request through a circuit switching network of a mobile communication network, and
after the communication apparatus has started up in response to the third startup request, the communication control unit is configured to perform control of communication through a packet switching network with the server.

5. The communication apparatus according to claim 3, wherein
the communication control unit is configured to:
in a case where the communication control unit is communicable with the server through a wireless LAN, after the update control unit has started up, cause communication through the wireless LAN to be executed between the update control unit and the server; and
in a case where the communication control unit is not communicable with the server through the wireless LAN, after the update control unit has started up, relay communication through a mobile communication network between the update control unit and the server.

6. The communication apparatus according to claim 4, wherein
the communication control unit is configured to:
in a case where the communication control unit is communicable with the server through a wireless LAN, after the update control unit has started up, cause communication through the wireless LAN to be executed between the update control unit and the server; and
in a case where the communication control unit is not communicable with the server through the wireless LAN, after the update control unit has started up, relay communication through a mobile communication network between the update control unit and the server.

7. The communication apparatus according to claim 2, wherein
the communication control unit is configured to:
in a case where the communication control unit is communicable with the server through a wireless LAN, after the update control unit has started up, cause communication through the wireless LAN to be executed between the update control unit and the server; and
in a case where the communication control unit is not communicable with the server through the wireless LAN, after the update control unit has started up, relay communication through a mobile communication network between the update control unit and the server.

8. The communication apparatus according to claim 1, wherein
before the second startup request is received from the server, the communication apparatus is configured to receive a third startup request for the communication apparatus from the server, and
after the communication apparatus has started up in response to the third startup request, the communication control unit is configured to perform control to receive the second startup request from the server.

9. The communication apparatus according to claim 8, wherein
the communication apparatus is configured to receive the third startup request through a circuit switching network of a mobile communication network, and
after the communication apparatus has started up in response to the third startup request, the communication control unit is configured to perform control of communication through a packet switching network with the server.

10. The communication apparatus according to claim 9, wherein
the communication control unit is configured to:
in a case where the communication control unit is communicable with the server through a wireless LAN, after the update control unit has started up, cause communication through the wireless LAN to be executed between the update control unit and the server; and
in a case where the communication control unit is not communicable with the server through the wireless LAN, after the update control unit has started up, relay communication through a mobile communication network between the update control unit and the server.

11. The communication apparatus according to claim 8, wherein
the communication control unit is configured to:
in a case where the communication control unit is communicable with the server through a wireless LAN, after the update control unit has started up, cause communication through the wireless LAN to be executed between the update control unit and the server; and
in a case where the communication control unit is not communicable with the server through the wireless LAN, after the update control unit has started up, relay communication through a mobile communication network between the update control unit and the server.

12. The communication apparatus according to claim 1, wherein
the communication control unit is configured to:
in a case where the communication control unit is communicable with the server through a wireless LAN, after the update control unit has started up, cause communication through the wireless LAN to be executed between the update control unit and the server; and
in a case where the communication control unit is not communicable with the server through the wireless LAN, after the update control unit has started up, relay communication through a mobile communication network between the update control unit and the server.

13. The communication apparatus according to claim 1, wherein
the movable object is a vehicle.

14. The communication apparatus according to claim 1, wherein
the update control unit is configured to control update of the movable object control unit over the air (OTA).

15. The communication apparatus according to claim 14, wherein
the movable object is a vehicle, and
the movable object control unit is an electronic control unit (ECU).

16. A movable object comprising the communication apparatus according to claim 1.

17. A control system comprising:
the communication apparatus according to claim 1;
the movable object control unit according to claim 1; and
the update control unit according to claim 1.

18. A communication control method executed by a communication apparatus that is provided in a movable object and an configured to communicate with a server, the communication apparatus controlling communication with the server, and also controlling communication with a movable object control unit configured to control the movable object and communication with an update control unit configured to control program update of the movable object control unit, the communication control method comprising:
when control on the movable object control unit is to be performed from the server, performing control to receive a first startup request and a command for the movable object control unit from the server, starting up the movable object control unit in response to the first startup request and the command from the server, and also controlling the movable object control unit in response to the command; and
when control related to program update of the movable object control unit is to be performed from the server, performing control to receive a second startup request for the update control unit from the server, and starting up the update control unit in response to the second startup request from the server.

* * * * *